United States Patent
Kang

(10) Patent No.: US 8,380,353 B2
(45) Date of Patent: Feb. 19, 2013

(54) METHOD FOR CALCULATING LOADING AMOUNT OF AMMONIA IN SELECTIVE CATALYTIC REDUCTION APPARATUS

(75) Inventor: Jungwhun Kang, Yongin (KR)

(73) Assignee: Hyundai Motor Company, Seoul (KR)

( * ) Notice: Subject to any disclaimer, the term of this patent is extended or adjusted under 35 U.S.C. 154(b) by 924 days.

(21) Appl. No.: 12/267,320

(22) Filed: Nov. 7, 2008

(65) Prior Publication Data

US 2009/0155153 A1 Jun. 18, 2009

(30) Foreign Application Priority Data

Dec. 14, 2007 (KR) .................... 10-2007-0131557

(51) Int. Cl.
*G05B 21/00* (2006.01)
(52) U.S. Cl. ...................................... 700/266
(58) Field of Classification Search .............. 700/266
See application file for complete search history.

(56) References Cited

U.S. PATENT DOCUMENTS 5,628,186 A * 5/1997 Schmelz .................. 60/274

* cited by examiner

*Primary Examiner* — Michael Marcheschi
*Assistant Examiner* — Jonathan Hurst
(74) *Attorney, Agent, or Firm* — Morgan, Lewis & Bockius LLP

(57) ABSTRACT

The present invention relates to a method for calculating loading amount of ammonia in a selective catalytic reduction apparatus, which may include: detecting a change amount of temperature in the selective catalytic reduction apparatus; determining whether the change amount of temperature in the selective catalytic reduction apparatus increases; calculating a loading modification amount of ammonia according to the change amount of temperature if the change amount of temperature in the selective catalytic reduction apparatus increases; calculating a loading change amount of ammonia based on the calculated loading modification amount of ammonia; calculating a current loading amount of ammonia based on the calculated loading change amount of ammonia; and dosing the current loading amount of ammonia into the selective catalytic reduction apparatus.

5 Claims, 5 Drawing Sheets

METHOD FOR CALCULATING LOADING AMOUNT OF AMMONIA IN SELECTIVE CATALYTIC REDUCTION APPARATUS

CROSS-REFERENCE TO RELATED APPLICATION

This application claims priority to and the benefit of Korean Patent Application No. 10-2007-0131557 filed in the Korean Intellectual Property Office on Dec. 14, 2007, the entire contents of which are incorporated herein by reference.

BACKGROUND OF THE INVENTION (a) Field of the Invention

The present invention relates to a method for calculating a loading amount of ammonia in a selective catalytic reduction apparatus. More particularly, the present invention relates to a method for calculating a loading amount of ammonia in a selective catalytic reduction apparatus, which maximizes the reduction rate of nitrogen oxide and prevents slip of ammonia as a consequence of precisely calculating the amount of ammonia loaded in the selective catalytic reduction apparatus.

(b) Description of the Related Art

Generally, exhaust gas flowing out through an exhaust manifold from an engine is driven into a catalytic converter mounted at an exhaust pipe and is purified therein. After that, the exhaust gas undergoes a decrease in noise while passing through a muffler and is emitted into the air through a tail pipe. The catalytic converter is a type of a diesel particulate filter (DPF) and purifies pollutants contained in the exhaust gas. A catalytic carrier for trapping particulate material (PM) contained in the exhaust gas is in the catalytic converter, and the exhaust gas flowing out from the engine is purified through chemical reaction.

One type of catalytic converter is a selective catalytic reduction (SCR) apparatus. In the selective catalytic reduction (SCR) apparatus, reductants such as carbon monoxide and total hydrocarbon (THC) react better with nitrogen oxide than oxygen. Thus, such a catalytic converter is called a selective catalytic reduction apparatus. An ammonia-SCR apparatus among the selective catalytic reduction apparatuses uses ammonia as a reductant in order to purify nitrogen oxide. According to the ammonia-SCR apparatus, nitrogen oxide is reduced well and accelerates a reaction between a monoxide and ammonia in a case that oxygen exists. Thus, the ammonia-SCR apparatus has been applicable to a diesel exhaust apparatus.

Such an ammonia-SCR apparatus applied to a vehicle for selectively removing nitrogen oxide is a urea-SCR apparatus. According to the urea-SCR apparatus, a urea solution is dosed upstream of an SCR catalyst and ammonia generated by decomposing urea is used in order to reduce nitrogen oxide. Therefore, the urea-SCR apparatus is a type of ammonia-SCR.

As the dosing amount of urea increases, the reduction rate of nitrogen oxide also increases according to the urea-SCR. However, if the dosing amount of urea is larger than a predetermined amount, a part of dosed urea is not decomposed or remaining ammonia that does not react with nitrogen oxide increases. Therefore, it is important to minimize the dosing amount of urea and to increase the reduction rate of nitrogen oxide according to the urea-SCR apparatus.

In addition, for increasing the reduction rate of nitrogen oxide and preventing slip of ammonia in the SCR apparatus, the actual loading amount of ammonia is controlled to be the same with a target loading amount of ammonia that can be loaded in the SCR apparatus. However, the loading amount of ammonia that is loaded in the SCR apparatus cannot be detected by a sensor and should be estimated.

According to prior arts, the loading amount of ammonia in the SCR apparatus is estimated by subtracting the ammonia amount that reacts with nitrogen oxide from the dosed ammonia amount. In this case, it is assumed that current loading amount of ammonia is not reduced.

However, the loading amount of ammonia in the SCR apparatus changes according to temperature. That is, if the temperature in the SCR apparatus increases, the loading amount of ammonia in the SCR apparatus decreases.

Therefore, the estimated loading amount of ammonia is different from the actual loading amount of ammonia, and accordingly, the reduction rate of nitrogen oxide may be deteriorated or a slip of ammonia may occur according to a conventional method for estimating the loading amount of ammonia in the SCR apparatus.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention has been made in an effort to provide a method for calculating a loading amount of ammonia in a selective catalytic reduction apparatus having advantages of maximizing a reduction rate of nitrogen oxide and preventing a slip of ammonia by precisely calculating the ammonia amount loaded in the SCR apparatus.

A method for calculating a loading amount of ammonia in a selective catalytic reduction apparatus may include: detecting a change amount of temperature in the selective catalytic reduction apparatus; determining whether the change amount of temperature in the selective catalytic reduction apparatus increases; calculating a loading modification amount of ammonia according to the change amount of temperature if the change amount of temperature in the selective catalytic reduction apparatus increases; calculating a loading change amount of ammonia based on the calculated loading modification amount of ammonia; calculating a current loading amount of ammonia based on the calculated loading change amount of ammonia; and dosing the current loading amount of ammonia into the selective catalytic reduction apparatus. The method may further comprise: setting the loading modification amount of ammonia as "0" if the change amount of temperature in the selective catalytic reduction apparatus does not increase. The loading modification amount of ammonia according to the change amount of temperature may be stored in a map. The method may further include: controlling a urea dosing amount for the current loading amount of ammonia into the selective catalytic reduction apparatus.

The loading change amount of ammonia may be calculated from the following equation: the loading change amount of ammonia=dosing amount of ammonia−reaction amount of ammonia−the calculated loading modification amount of ammonia, wherein the dosing amount of ammonia is determined according to a flow amount of exhaust gas and a nitrogen oxide amount in the exhaust gas, and the reaction amount of ammonia is determined according to a previous loading amount of ammonia and a temperature and the nitrogen oxide amount in the selective catalytic reduction apparatus.

The calculated current loading amount of ammonia may be stored as a previous loading amount of ammonia in a control unit.

The current loading amount of ammonia may be calculated from the following equation: the current loading amount of ammonia=the previous loading amount of ammonia+the calculated loading change amount of ammonia.

DETAILED DESCRIPTION OF THE EMBODIMENTS

An exemplary embodiment of the present invention will hereinafter be described in detail with reference to the accompanying drawings.

Figure 1:
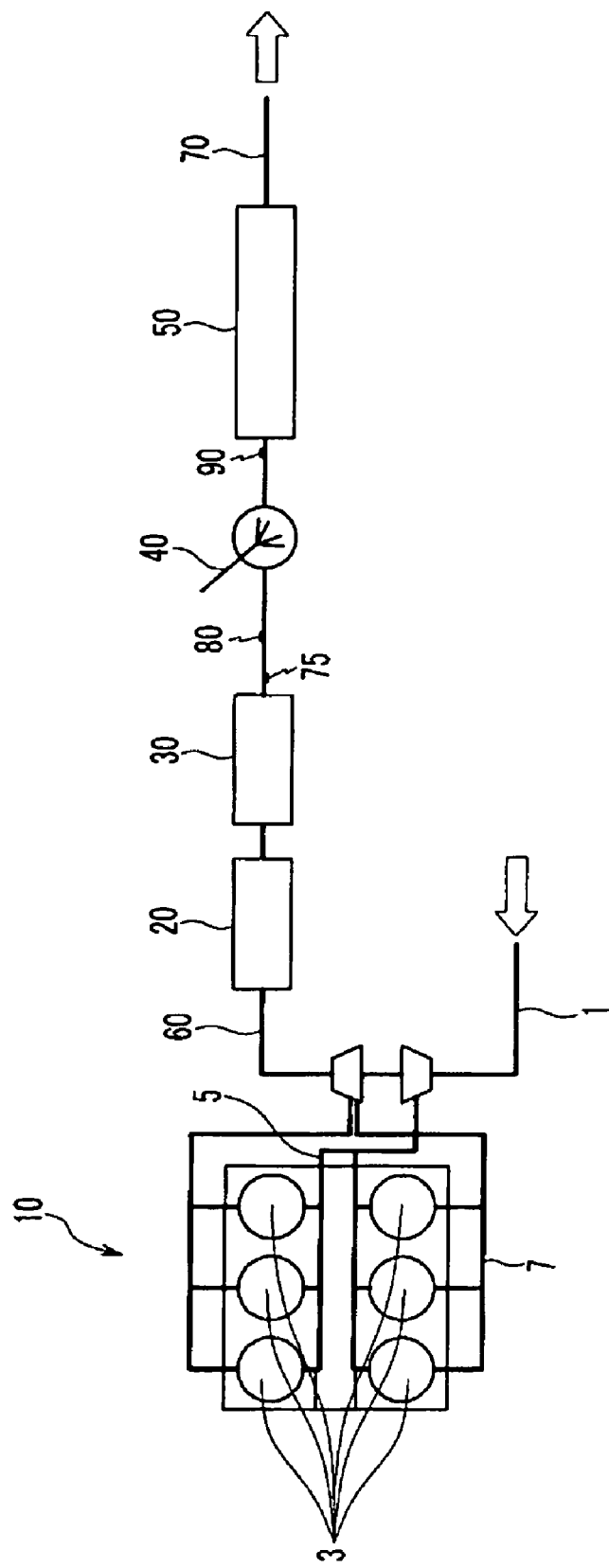
FIG. 1 is a schematic diagram of an exhaust apparatus that is applicable to a method for calculating a loading amount of ammonia in a selective catalytic reduction apparatus according to an exemplary embodiment of the present invention.

FIG. 1 is a schematic diagram of an exhaust apparatus that is applicable to a method for calculating loading amount of ammonia in a selective catalytic reduction apparatus according to an exemplary embodiment of the present invention.

As shown in FIG. 1, exhaust gas from an engine 10 flows through an exhaust pipe 60 and is emitted into the air through a tail pipe 70 after noxious materials contained in the exhaust gas are removed.

The engine 10 includes a plurality of cylinders 3 for burning an air-fuel mixture. Each cylinder 3 is connected to an intake manifold 5 so as to receive the air-fuel mixture, and the intake manifold 5 is connected to an intake pipe 1 so as to receive fresh air.

In addition, each cylinder 3 is connected to an exhaust manifold 7 and the exhaust gas generated in a combustion process is gathered in the exhaust manifold 7. The exhaust manifold 7 is connected to the exhaust pipe 60.

A diesel oxidation catalyst apparatus 20, a diesel particulate filter 30, a nozzle 40, and a selective catalytic reduction apparatus 50 are mounted in sequence on the exhaust pipe 60 so as to remove the noxious materials contained in the exhaust gas.

The diesel oxidation catalyst apparatus 20 reduces nitrogen oxide contained in the exhaust gas to nitrogen dioxide, and supplies the nitrogen dioxide to the diesel particulate filter 30.

The diesel particulate filter 30 filters and stores particulate material contained in the exhaust gas, and the stored particulate material is burned under predetermined conditions.

The nozzle 40 doses urea into the exhaust gas. The dosed urea is decomposed to ammonia and the ammonia is used in the selective catalytic reduction apparatus 50.

The selective catalytic reduction apparatus 50 uses the ammonia that is decomposed from the urea in order to reduce nitrogen dioxide and nitrogen monoxide to nitrogen gas.

The diesel oxidation catalyst apparatus 20, the diesel particulate filter 30, the nozzle 40, and the selective catalytic reduction apparatus 50 are well known to a person of ordinary skill in the art, and thus a detailed description thereof will be omitted.

In addition, as an exemplary embodiment of the present invention, a flow meter 75 and a nitrogen oxide sensor 80 are mounted between diesel oxidation catalyst apparatus 20 and the nozzle 40 on the exhaust pipe 60, and a temperature sensor 90 is mounted at an inlet of the selective catalytic reduction apparatus 50.

Figure 2:
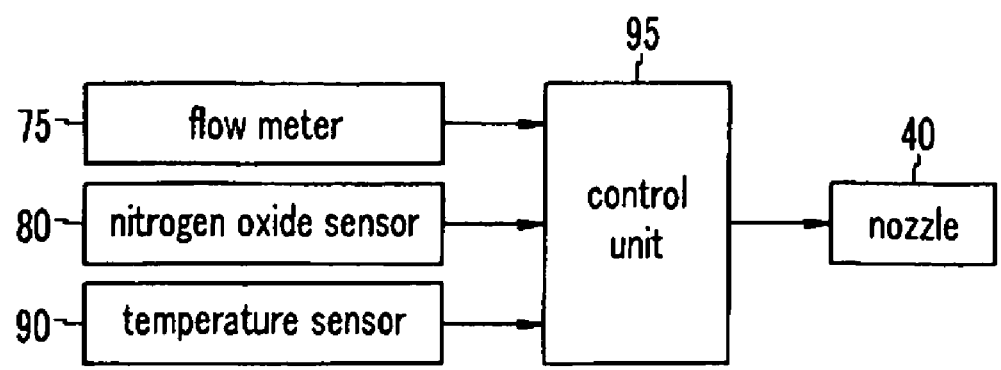
FIG. 2 is a schematic diagram of a system performing a method for calculating a loading amount of ammonia in a selective catalytic reduction apparatus according to an exemplary embodiment of the present invention.

FIG. 2 is a schematic diagram of a system performing a method for calculating a loading amount of ammonia in a selective catalytic reduction apparatus according to an exemplary embodiment of the present invention.

As shown in FIG. 2, a system performing a method for calculating a loading amount of ammonia in the selective catalytic reduction apparatus according to an exemplary embodiment of the present invention includes a control unit 95, sensing device such as the flow meter 75, the nitrogen oxide sensor 80, the temperature sensor 90, and an actuator such as the nozzle 40.

The flow meter 75 detects flow amount of the exhaust gas flowing through the exhaust pipe 60, and transmits a signal corresponding thereto to the control unit 95.

The nitrogen oxide sensor 80 detects a nitrogen oxide amount in the exhaust gas and transmits a signal corresponding thereto to the control unit 95.

The temperature sensor 90 detects the temperature of the exhaust gas input into the selective catalytic reduction apparatus 50 and transmits a signal corresponding thereto to the control unit 95.

The control unit 95 can be realized by one or more processors activated by a predetermined program, and the predetermined program can be programmed to perform each step of the method for calculating a loading amount of ammonia in the selective catalytic reduction apparatus according to an embodiment of this invention.

The control unit 95 is electrically connected to the flow meter 75, the nitrogen oxide sensor 80, and the temperature sensor 90, and receives signals corresponding to the flow amount of the exhaust gas, the nitrogen oxide amount in the exhaust gas, and the temperature of the exhaust gas input into the selective catalytic reduction apparatus 50.

In addition, the control unit 95 calculates a change amount of the temperature in the selective catalytic reduction apparatus 50, loading modification amount of the ammonia according to the change amount of the temperature, a loading change amount of the ammonia, and a current loading amount of the ammonia based on the signals.

The nozzle 40 doses urea into the exhaust gas according to control of the control unit 95.

Hereinafter, the method for calculating a loading amount of ammonia in the selective catalytic reduction apparatus according to an exemplary embodiment of the present invention will be described in detail.

Figure 3:
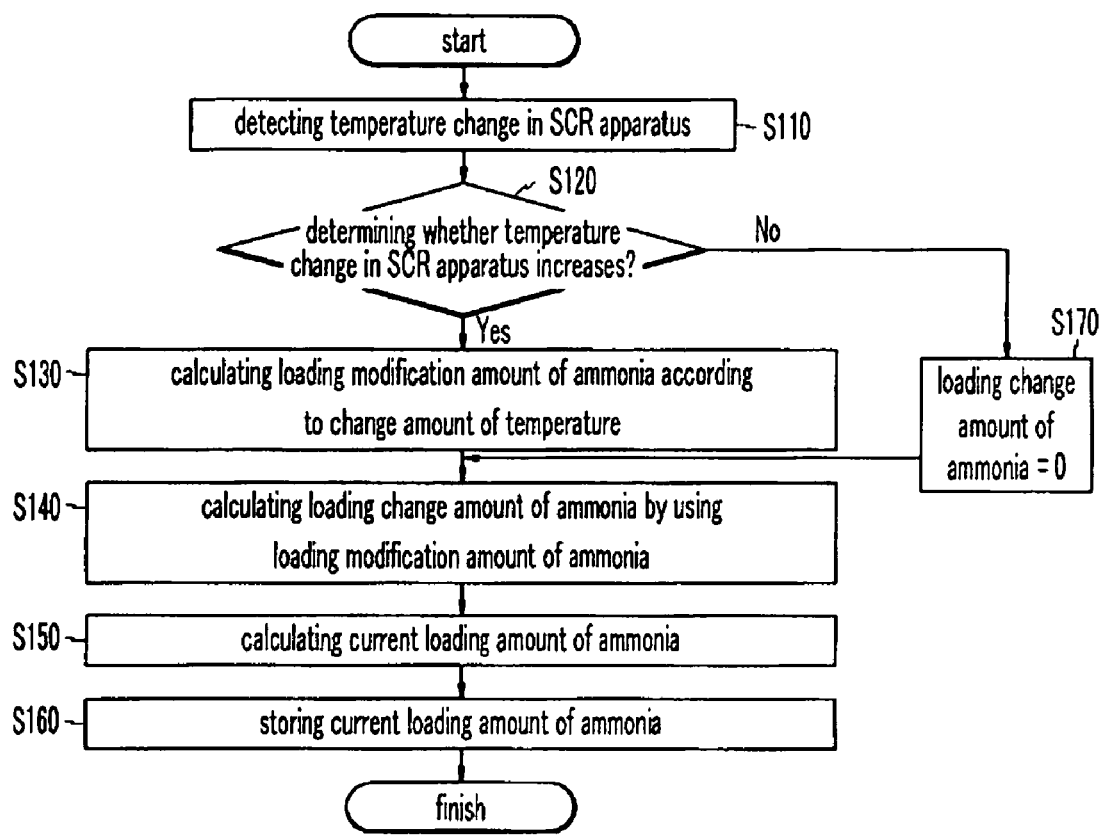
FIG. 3 is a flow chart of a method for calculating a loading amount of ammonia in a selective catalytic reduction apparatus according to an exemplary embodiment of the present invention.

FIG. 3 is a flow chart of a method for calculating loading amount of ammonia in a selective catalytic reduction apparatus according to an exemplary embodiment of the present invention.

As shown in FIG. 3, if respective sensors 75, 80, and 90 detect the flow amount of the exhaust gas, the nitrogen oxide amount in the exhaust gas, and the temperature of the exhaust gas input into the selective catalytic reduction apparatus 50, the control unit 95 detects the change amount of the temperature in the selective catalytic reduction apparatus at step S110.

If the change amount of the temperature increases, the loading amount of the ammonia decreases. Therefore, the control unit 95 determines whether the change amount of the temperature in the selective catalytic reduction apparatus increases at step S120.

Figure 4:
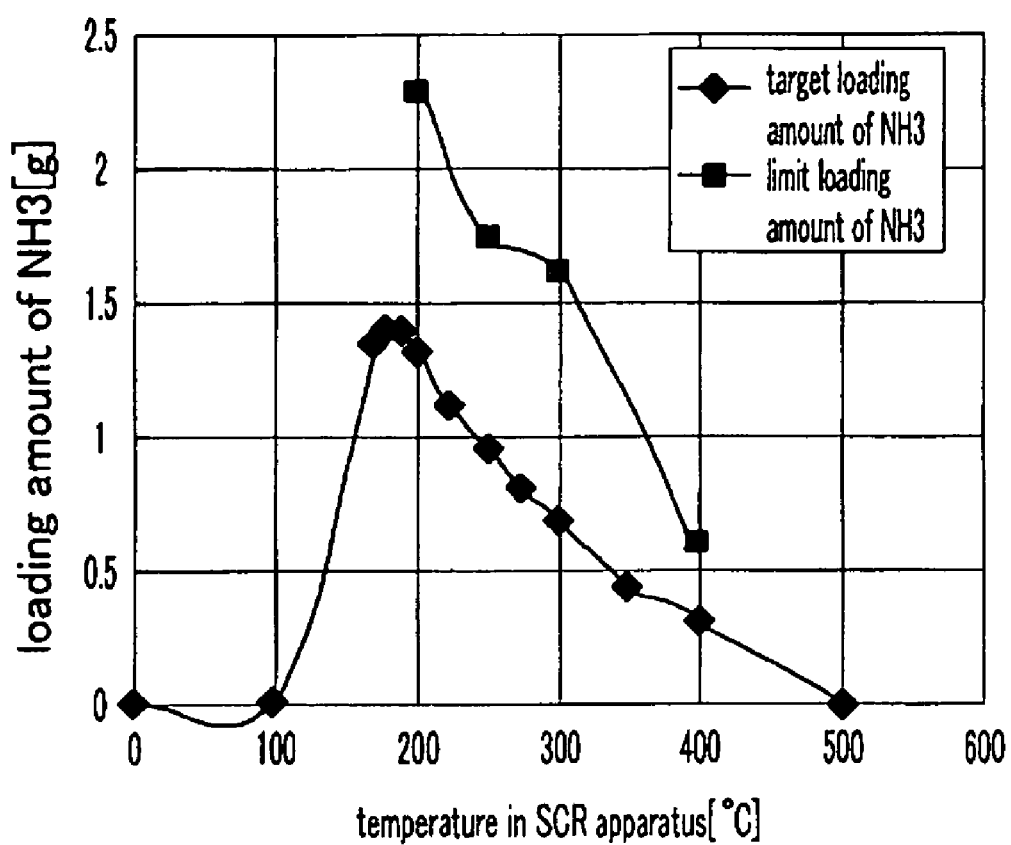
FIG. 4 is one exemplary map of a loading modification amount of ammonia to change amount of temperature.
Figure 5:
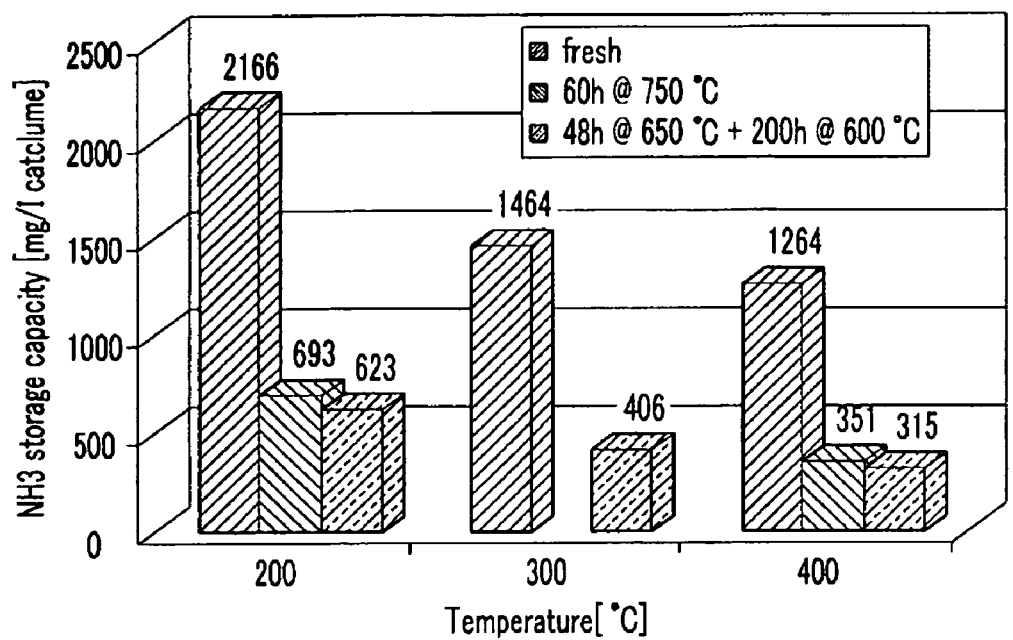
FIG. 5 is a graph showing a loading amount of ammonia according to temperature in a selective catalytic reduction apparatus.

If the change amount of the temperature in the selective catalytic reduction apparatus increases at the step S120, the control unit 95 calculates the loading modification amount of the ammonia according to the change amount of the temperature at step S130. As shown in FIG. 4, the loading modification amount of the ammonia dm according to the change amount of the temperature dT is already stored in a map, and the control unit 95 calculates the loading modification amount of the ammonia according to the calculated change amount of the temperature based on the map. The map shown in FIG. 4 is produced by many experiments.

If the change amount of the temperature in the selective catalytic reduction apparatus does not increase at the step S120, the control unit 95 sets the loading modification amount of the ammonia according to the change amount of the temperature as "0" at step S170.

After that, the control unit 95 calculates the loading change amount of the ammonia by using the loading modification amount of the ammonia at step S140. The loading change amount of the ammonia is calculated from the following equation: loading change amount of ammonia=dosing amount of ammonia−reaction amount of ammonia−loading modification amount of ammonia.

In addition, the dosing amount of the ammonia is determined according to the flow amount of the exhaust gas and the nitrogen oxide amount in the exhaust gas. That is, the dosing amount of the urea is determined according to the flow amount of the exhaust gas and the nitrogen oxide amount in the exhaust gas, and thus the dosing amount of the ammonia that is generated by decomposing the urea can be determined.

In addition, the reaction amount of the ammonia is determined according to a previous loading amount of the ammonia, the temperature in the selective catalytic reduction apparatus, and the nitrogen oxide amount. That is, if the previous loading amount of the ammonia and the nitrogen oxide amount are known, the reaction amount of the ammonia can be calculated from the chemical reaction equation between the ammonia and the nitrogen oxide. In this case, since a chemical reaction between the ammonia and the nitrogen oxide is sensitive to temperature, the reaction amount of the ammonia may be determined by considering the temperature in the selective catalytic reduction apparatus.

Meanwhile, the previous loading amount of the ammonia is previously calculated by the method for calculating a loading amount of the ammonia in the selective catalytic reduction apparatus according to an exemplary embodiment of the present invention, and is stored in the control unit 95.

After that, the control unit 95 calculates the current loading amount of the ammonia by using the loading change amount of the ammonia at step S150. The current loading amount of the ammonia is calculated from the following equation: current loading amount of ammonia=previous loading amount of ammonia+loading change amount of ammonia.

Finally, the control unit 95 stores the current loading amount of the ammonia at step S160, and controls the urea dosing amount in accordance thereto. In addition, the stored current loading amount of the ammonia is used as the previous loading amount of the ammonia for the next calculation.

As described above, the current loading amount of the ammonia can be precisely calculated considering the loading change amount of the ammonia according to the change amount of the temperature in the selective catalytic reduction apparatus according to the exemplary embodiment of the present invention. Therefore, the reduction rate of the nitrogen oxide may be maximized and slip of the ammonia may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for determining a loading amount of ammonia in a selective catalytic reduction apparatus, comprising:
    detecting changes in amount of temperature in the selective catalytic reduction apparatus including increasing and decreasing changes in amount of temperature;
    determining whether the change amount of temperature in the selective catalytic reduction apparatus increases;
    calculating a loading modification amount of ammonia according to the change amount of temperature, determining the loading modification amount of ammonia according to a change amount of temperature in the selective catalytic reduction apparatus if the change amount of temperature in the selective catalytic reduction apparatus increases, and otherwise setting the loading modification amount of the ammonia as "0" if the change amount of temperature in the selective catalytic reduction apparatus does not increase;
    determining a loading change amount of ammonia based on the determined loading modification amount of ammonia;
    determining a current loading amount of ammonia based on the determined loading change amount of ammonia; and
    dosing the current loading amount of ammonia into the selective catalytic reduction apparatus;
    wherein the loading change amount of ammonia is determined from the following equation: the loading change amount of ammonia=dosing amount of ammonia −reaction amount of ammonia −the determined loading modification amount of ammonia;
    wherein the dosing amount of ammonia is determined according to a flow amount of exhaust gas and a nitrogen oxide amount in the exhaust gas; and
    wherein the reaction amount of ammonia is determined according to a previous loading amount of ammonia and a temperature and the nitrogen oxide amount in the selective catalytic reduction apparatus.

2. The method of claim 1, wherein the loading modification amount of ammonia according to the change amount of temperature is stored in a map.

3. The method of claim 1, wherein the determined current loading amount of ammonia is stored as a previous loading amount of ammonia in a control unit.

4. The method of claim 1, wherein the current loading amount of ammonia is determined from the following equation: the current loading amount of ammonia =the previous loading amount of ammonia +the determined loading change amount of ammonia.

5. The method of claim 1, further controlling a urea dosing amount for the current loading amount of ammonia into the selective catalytic reduction apparatus.

* * * * *